United States Patent
Cattaneo

(10) Patent No.: US 12,364,334 B2
(45) Date of Patent: *Jul. 22, 2025

(54) SUPPORTING DEVICE FOR FURNITURE SHELVES WITH OPTIMIZED LOAD TRANSFER

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 79 days.

This patent is subject to a terminal disclaimer.

(21) Appl. No.: 18/249,750

(22) PCT Filed: Oct. 29, 2021

(86) PCT No.: PCT/IB2021/060031
§ 371 (c)(1),
(2) Date: Apr. 20, 2023

(87) PCT Pub. No.: WO2022/097002
PCT Pub. Date: May 12, 2022

(65) Prior Publication Data
US 2023/0380595 A1    Nov. 30, 2023

(30) Foreign Application Priority Data

Nov. 5, 2020 (IT) .................. 102020000026440

(51) Int. Cl.
A47B 96/06 (2006.01)

(52) U.S. Cl.
CPC .................. *A47B 96/066* (2013.01)

(58) Field of Classification Search
CPC ......... A47B 96/066; F16B 12/22; F16B 12/24
See application file for complete search history.

(56) References Cited

U.S. PATENT DOCUMENTS

| | | | |
|---|---|---|---|
| 10,034,542 B2 * | 7/2018 | Giovannetti | A47B 47/0091 |
| 11,877,657 B2 * | 1/2024 | Cattaneo | F16B 12/24 |
| 2004/0155163 A1 * | 8/2004 | Migli | F16B 12/24 248/235 |
| 2023/0404262 A1 * | 12/2023 | Cattaneo | A47B 96/066 |
| 2024/0016291 A1 * | 1/2024 | Cattaneo | A47B 96/066 |

FOREIGN PATENT DOCUMENTS

| | | |
|---|---|---|
| CN | 109008350 | 12/2018 |
| WO | 2015158622 | 10/2015 |

* cited by examiner

*Primary Examiner* — Matthew W Ing
(74) *Attorney, Agent, or Firm* — Themis Law; Franco A. Serafini

(57) ABSTRACT

A shelf-supporting device configured to create a reversible connection of a shelf with an opposite shoulder of a piece of furniture includes a shelf bracket having a main body, which has a shaped profile and a solid section at its front area, with a pin protruding from the front area so that forces can be transferred from the pin to an area of the main body in having greater resistance to the loads carried by the device.

20 Claims, 8 Drawing Sheets

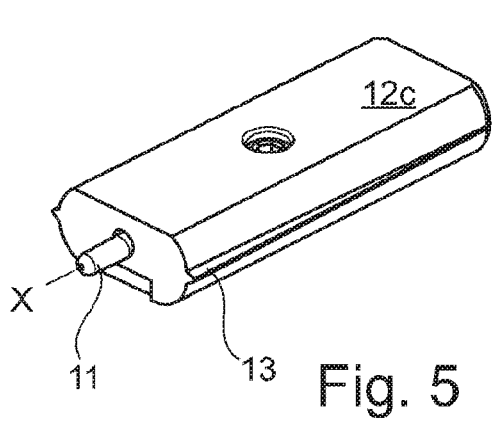
Fig. 5
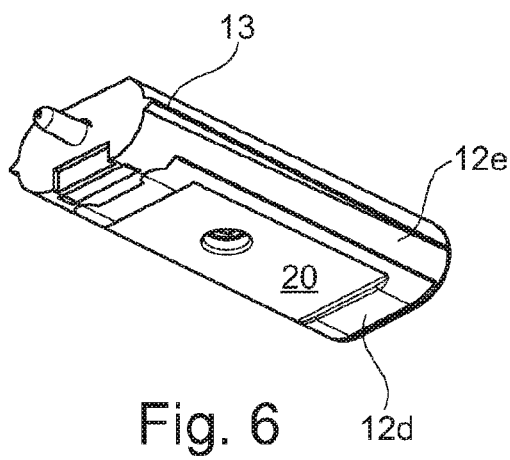
Fig. 6
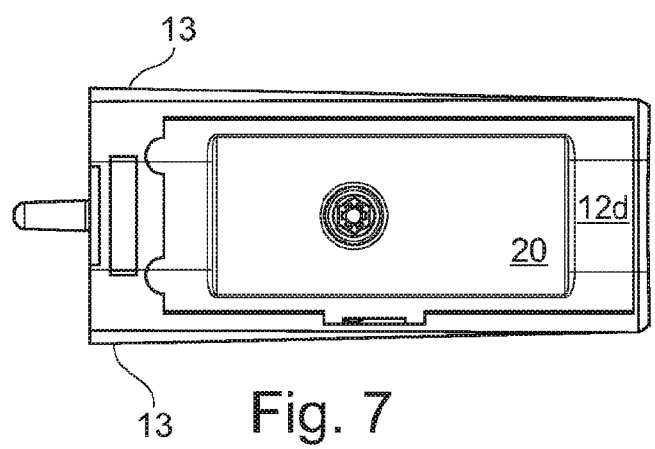
Fig. 7
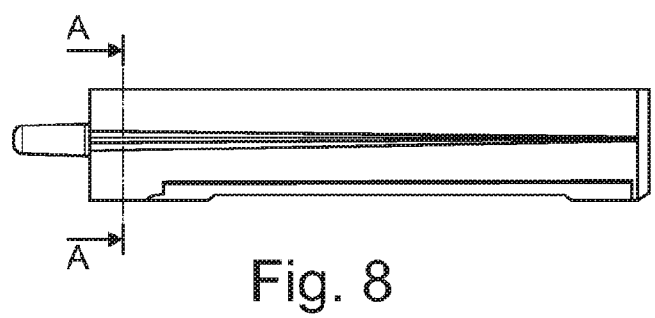
Fig. 8
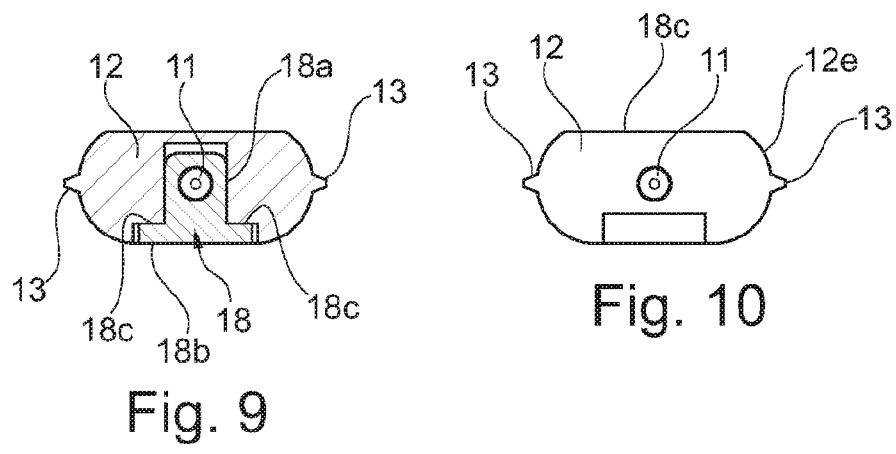
Fig. 9
Fig. 10

SUPPORTING DEVICE FOR FURNITURE SHELVES WITH OPTIMIZED LOAD TRANSFER

FIELD OF THE INVENTION

The present invention relates to an improved supporting device for furniture shelves for the reversible connection of a shelf to the opposite shoulders of a piece of furniture.

The device according to the present invention responds to the need, felt in the sector, for being able to provide furniture shelves with supporting devices that create a connection with the shoulders of an increasingly miniaturized piece of furniture, so as to minimize the aesthetic impact and possibly disappearing completely from sight when the shelf is assembled, while responding to the need for ensuring a safe and stable connection of the shelf, capable of supporting even extremely heavy loads.

The present invention provides a shelf bracket capable of optimizing the transfer of the loads created in normal use.

STATE OF THE ART

Devices of the type considered herein are commonly called shelf brackets in the field, and exert the function of allowing a horizontal element (shelf) of a piece of furniture to be stably but removably supported and fixed between two vertical elements commonly called the shoulders of a piece of furniture.

Said shelves and said shoulders are arranged perpendicular to each other.

Shelf brackets of this type are known from the state of the art, and in particular the Applicant itself is the holder of Italian patent application nr. 102019000013428 and also Italian patent application nr. 102019000016343 that illustrate devices with respect to which the present invention represents a further improvement.

More specifically, these known solutions generally respond to the need for creating a shelf-supporting device which has a minimum aesthetic impact once assembled in the shelf and which allows easy and fast assembly and disassembly of the shelf itself with respect to the shoulders of the furniture.

Purely by way of example, with reference to the attached FIGS. 1 to 3, an example of a known type of shelf bracket 100' is shown which allows the reversible connection of a shelf to the shoulders of a piece of furniture.

The reversible connection between the shelf 200 and the shoulders 300 of the piece of furniture is obtained through a shelf-supporting device 100' comprising a pin or plug 110 which is connected to movable engagement means 150 of said device suitable for moving said pin 110 with respect to the main body 120 of the device itself.

The main body 120 is configured for being inserted into said shelf, in particular into a housing formed within the thickness of the shelf, so that when the device is assembled on the shelf said pin or plug 110 can be moved between an operating position in which it protrudes from the edge B of said shelf 200 so as to be able to be inserted into a corresponding housing hole 301 formed on the shoulder 300 of the piece of furniture.

As already mentioned, this known type of shelf-supporting device 100' comprises a main body 120 with respect to which movable engagement means 150 are slidingly associated in turn associated with the engagement pin 110.

As the device 100' is configured so that it can be inserted within the thickness of the shelf 200, the main body 120 has a box-like shape, and is preferably formed by the coupling of two half-shells according to what can be seen for example in the exploded view of FIG. 1.

The shelf-supporting devices of the type described so far are not, however, free from drawbacks.

One of these drawbacks is represented by the resistance to loads by the device itself, but also by the shelf+device complex.

The need, in fact, for providing a device with increasingly reduced dimensions in order to minimize the aesthetic impact of the device and housing seat to be created within the shelf, often involves an inadequate resistance to loads.

In particular, the miniaturization of the shelf-supporting device involves a greater concentration of the loads that are transferred to the shelf itself through the device as the contact surfaces between the device and the internal surfaces of the housing seat of the device within the thickness of the shelf, decrease.

By way of example, with reference to the attached FIGS. 15 and 16, the loads P acting on the shelf create a reaction force Rp on the pin of the device which, in turn, involves the transfer of a resultant Rr from the shelf bracket to the shelf.

As can be seen in FIG. 16, the resultant Rr, which is transferred from the device to the shelf, acts specifically in correspondence with the section of the shelf having a smaller thickness, due to the presence of the housing seat of the device formed in said section.

This obviously implies that there are limits imposed by the resistance to loads in the possibility of miniaturizing the shelf-supporting device and reducing the thickness of the shelf itself.

SUMMARY OF THE INVENTION

In the light of what is specified above, the undertaking of the present invention is to solve the drawbacks affecting shelf-supporting devices known in the state of the art.

Within this undertaking, the objective of the present invention is to provide a shelf-supporting device for shelves and for supporting and fixing shelves to the shoulders of a piece of furniture, which further improves the mechanical resistance of the shelf bracket itself and of the shelf bracket+shelf complex, while remaining a device having reduced dimensions and with a reduced aesthetic impact.

An objective of the present invention is also to provide a shelf-supporting device that is more versatile, as it can be inserted into shelves having an extremely reduced thickness, so that it can used with multiple types of shelves and in furniture with a particularly refined aesthetic impact.

The above-mentioned undertaking, as also the above-mentioned objectives and others that will appear more evident hereunder, are achieved by a shelf-supporting device for the reversible connection of a shelf to the shoulders of a piece of furniture according to the enclosed claim 1.

Further characteristics of the preferred embodiments of the device according to the present invention described in the present application are object of the dependent claims.

LIST OF FIGURES

Further characteristics and advantages will become more evident from the description of a preferred but non-exclusive embodiment of the shelf bracket for the reversible connection of a shelf to the shoulders of a piece of furniture illustrated by way of non-limiting example with the aid of the attached drawings in which:

FIGS. 5 and 6 show perspective views from above and from below respectively of the shelf-supporting device according to the present invention;

FIG. 7 shows a view from below of the device according to the invention;

FIG. 8 shows a right side view of the device according to the invention;

FIG. 9 shows a section of the device according to the sectional plane A-A of FIG. 8;

Figure 11:
Figure 12:
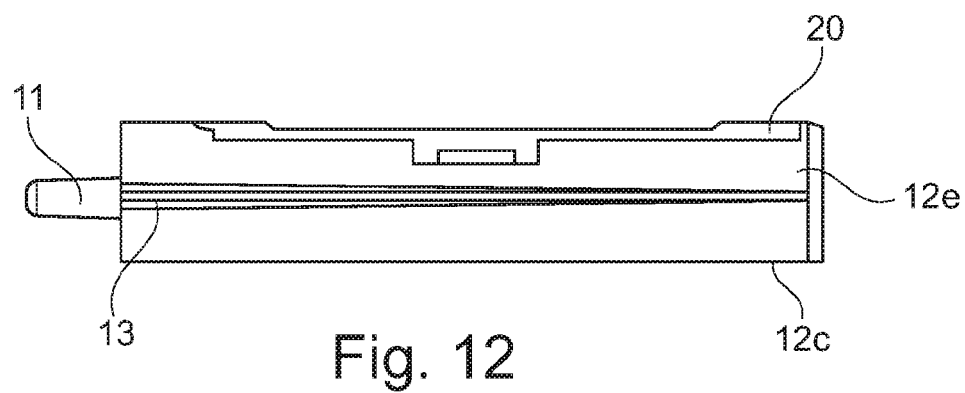
Figure 13:
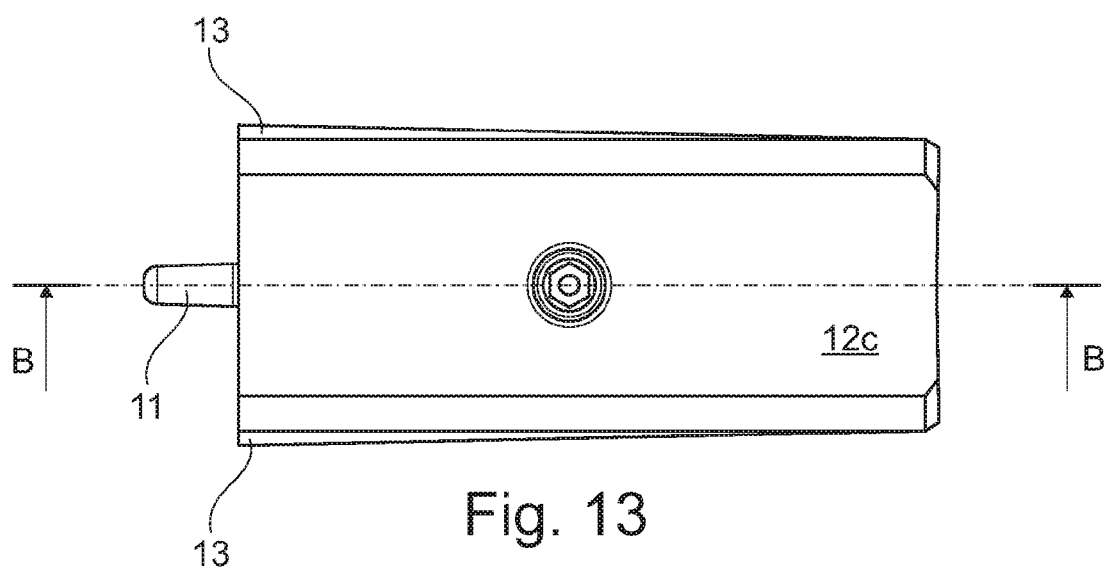
Figure 14:
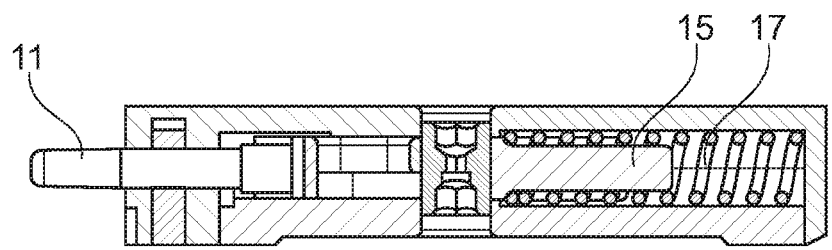
Figure 15:
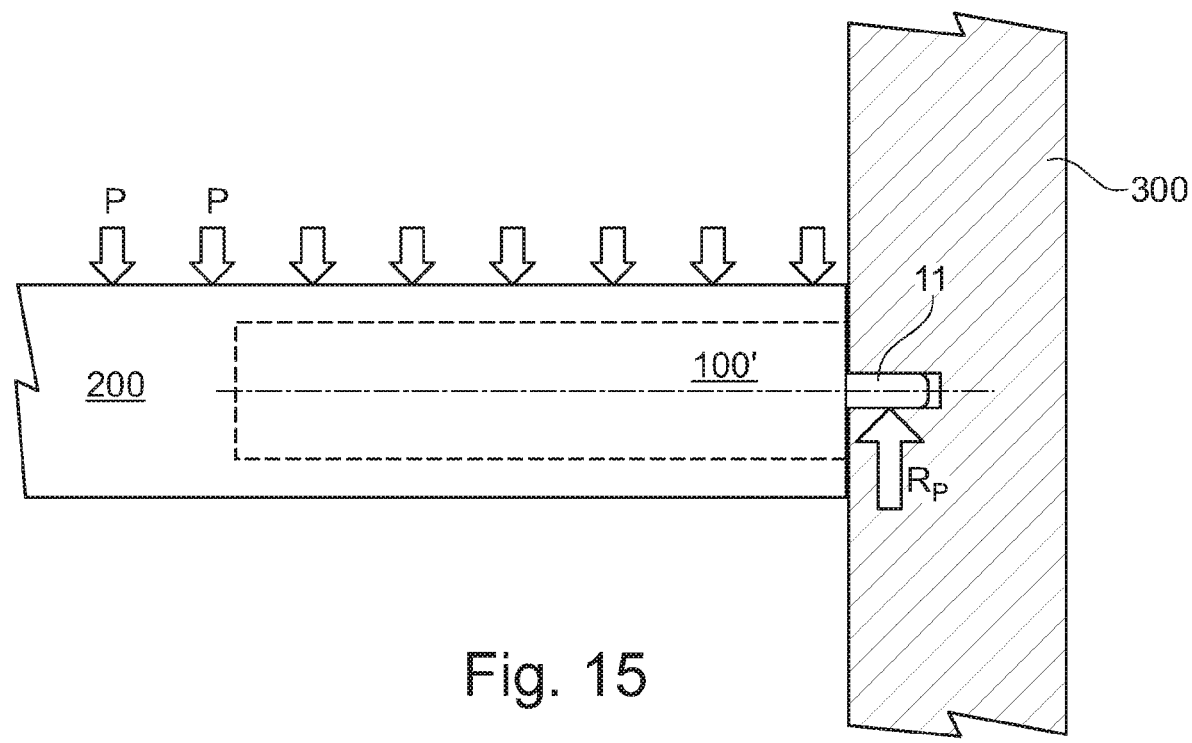
Figure 16:
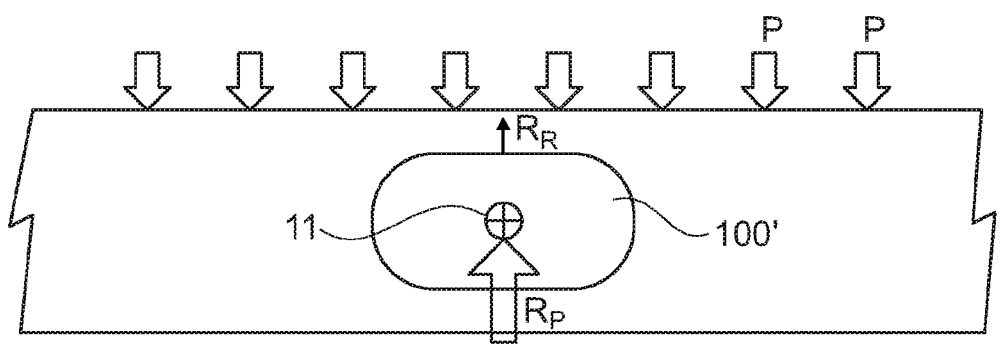
Figure 17:
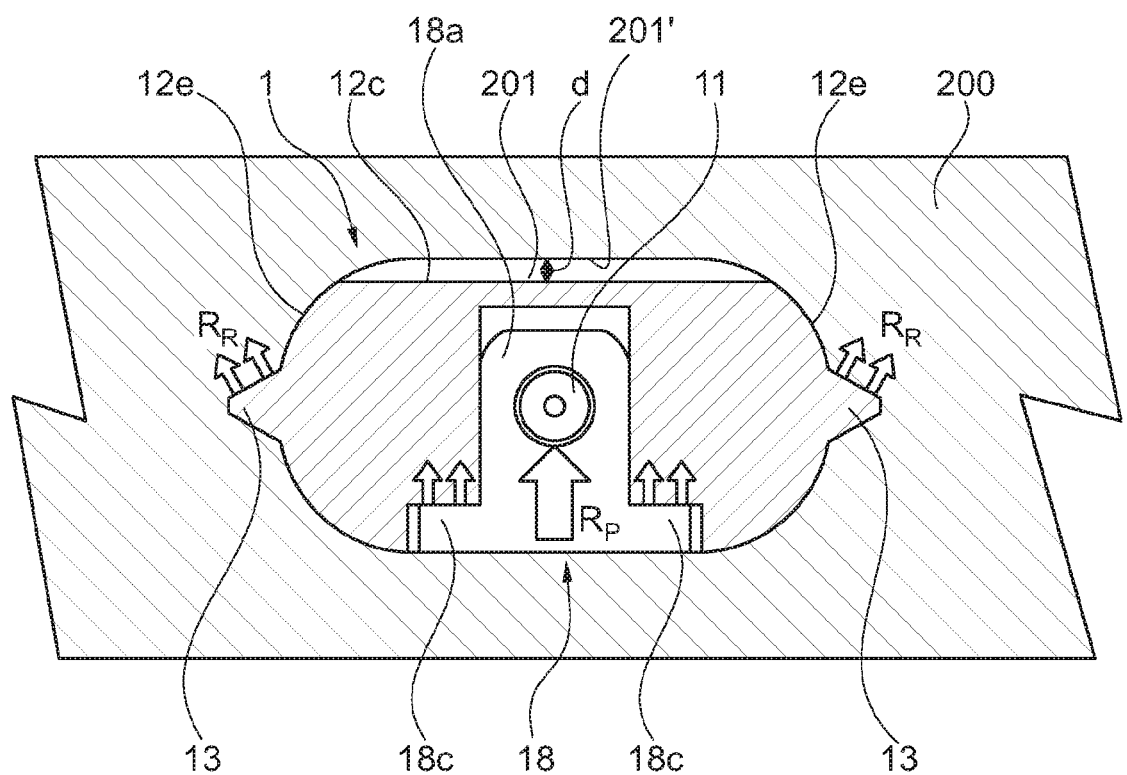
Figure 18:
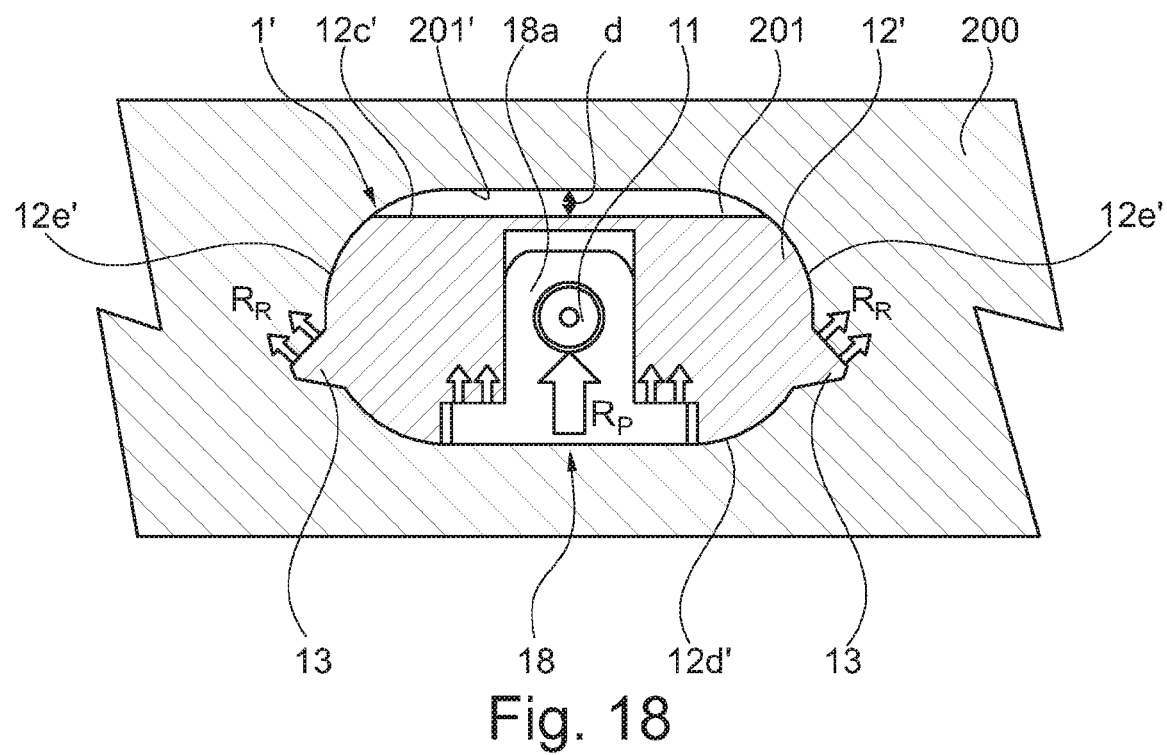
Figure 19:
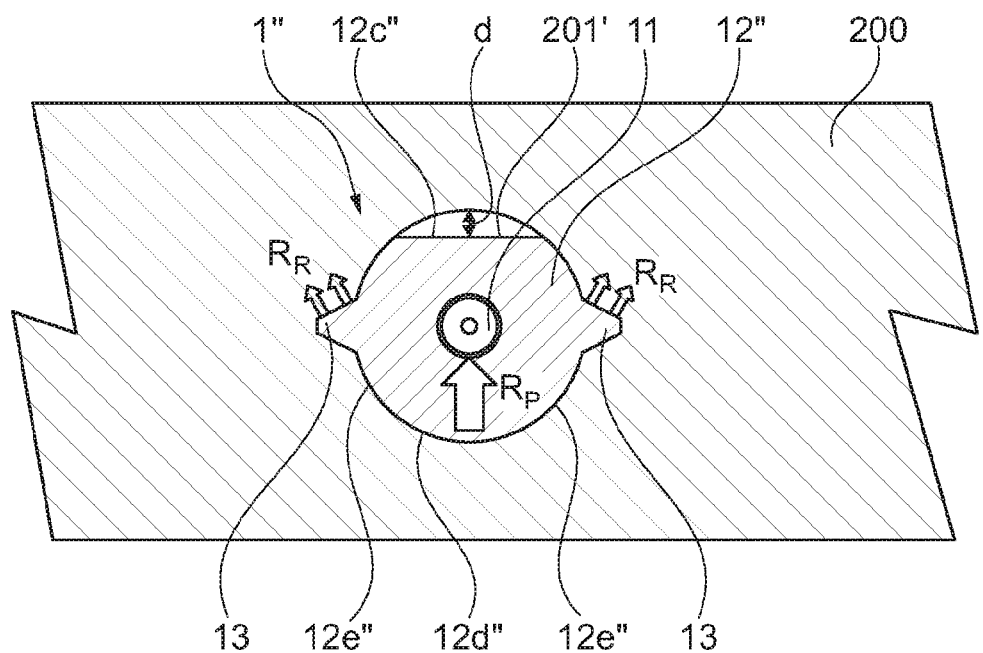

FIGS. 10 and 11 respectively show a front view and a rear view of the shelf-supporting device according to the invention;

FIG. 12 shows a left side view of the device according to the invention;

FIG. 13 shows a view from above of the shelf-supporting device according to the invention;

FIG. 14 shows a section of the device according to the sectional plane B-B of FIG. 13;

FIGS. 15 and 16 illustrate the loads acting on the shelf assembled on the shoulder and the consequent stress on the pin of the shelf bracket;

FIG. 17 illustrates a sectional view with a transverse vertical plane of the shelf-supporting device according to the invention in accordance with a first preferred embodiment, inserted into a seat formed in the shelf;

FIG. 18 illustrates a sectional view with a transverse vertical plane of the shelf-supporting device according to the invention in accordance with a second preferred embodiment, inserted into a seat formed in the shelf;

FIG. 19 illustrates a sectional view with a transverse vertical plane of the shelf-supporting device according to the invention in accordance with a third preferred embodiment, inserted into a seat formed in the shelf.

DETAILED DESCRIPTION OF THE INVENTION

Figure 1:
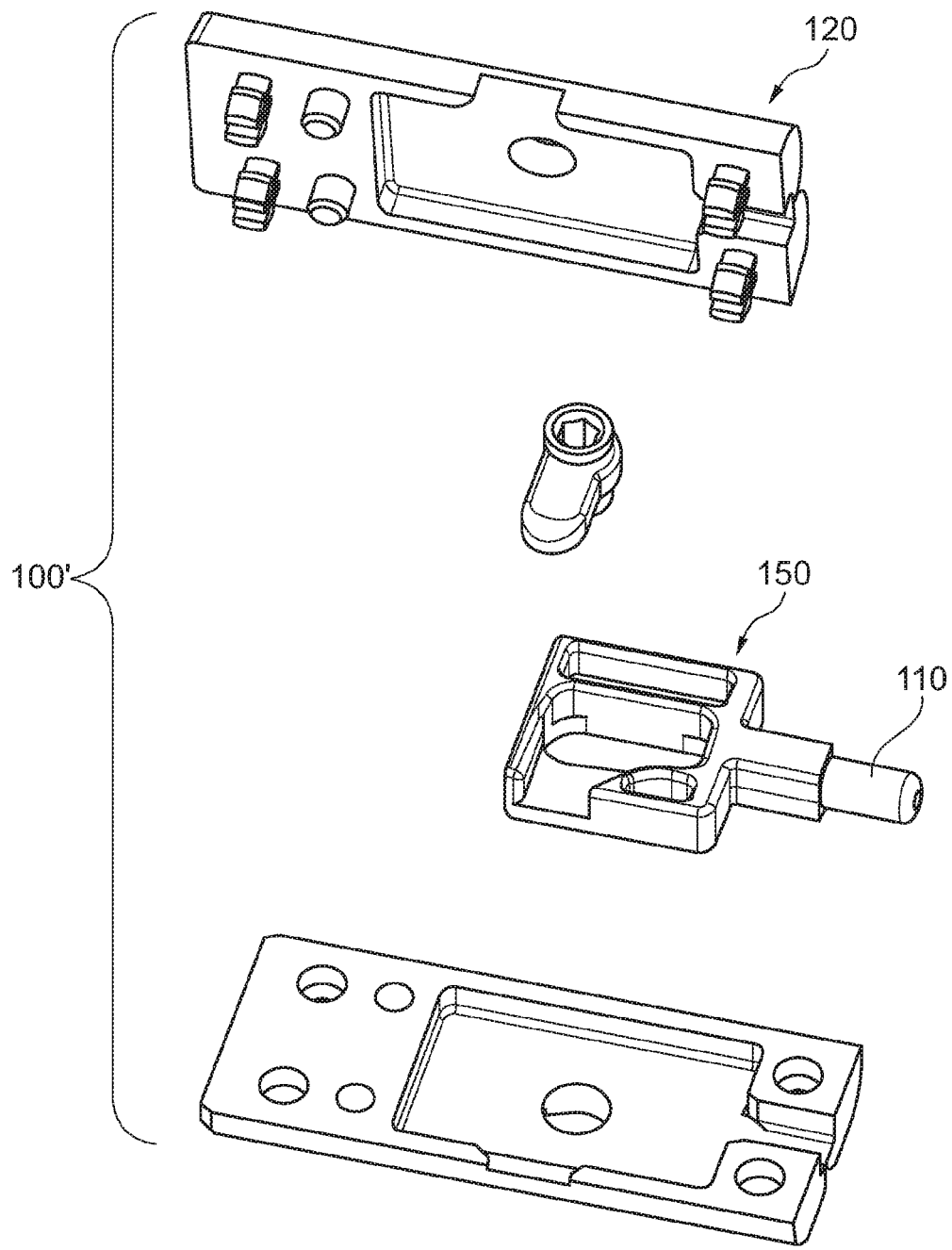
FIGS. 1 to 3 are representative of the shelf-supporting device of the type known from the previous patent applications in the name of the same applicant indicated above.
Figure 2:
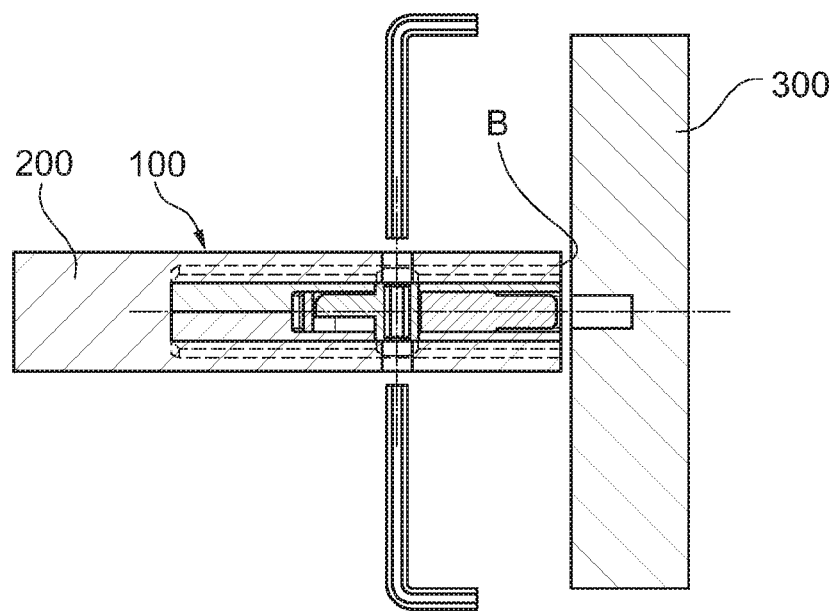
Figure 3:
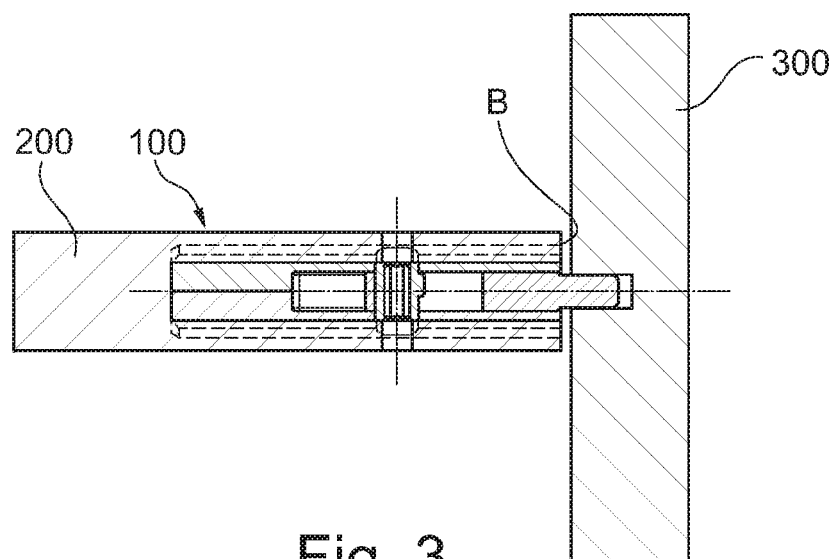

With particular reference to the attached FIGS. 1 to 3, these illustrate an example of a shelf-supporting device 100' of a known type for the reversible connection of a shelf 100' to the opposite shoulders 200 of a piece of furniture, according to what is known from the above-mentioned patent applications in the name of same applicant.

The shelf-supporting device 100' is of the type suitable for creating the connection by means of a pin 110 associated with the shelf 200 and configured for protruding from the transverse edge B of said shelf 200 and suitable for being inserted into a corresponding housing hole 301 formed on the shoulder 300 of a piece of furniture, and has a main body 120 with which movable engagement means 150 are slidingly associated which are produced integrally with the pin 110 or can be associated with the latter with a shape coupling or an interlocking or similar systems.

The device 100' of the known type comprises a main body configured for being inserted into the thickness of the shelf.

Figure 4:
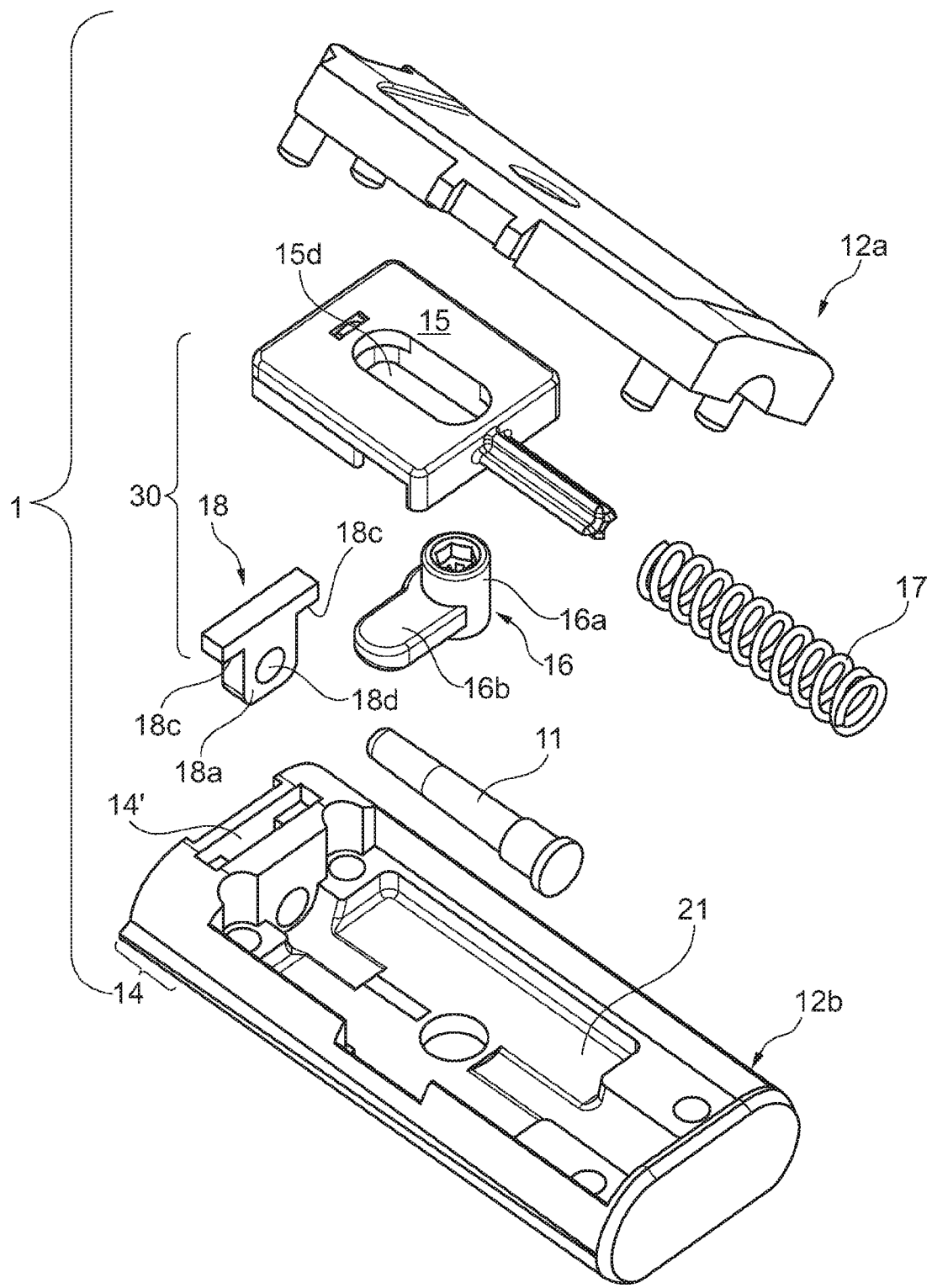
FIG. 4 shows an exploded view of the shelf-supporting device according to the present invention.

When the device 100' is in use, as shown for example in FIGS. 3 and 4, the loads acting on the pin 110 are those shown schematically in FIGS. 15 and 16.

For the sake of conciseness, reference will be made hereunder indifferently to the shelf-supporting device 1, 1', 1", but it should be understood that the present invention also relates to a combination of a shelf-supporting device as described and its housing seat.

As shown in the attached FIGS. 15 and 16, the loads P acting on the shelf entail a reaction force Rp on the pin of the device which, in turn, involves the transfer of a resultant Rr from the shelf bracket to the shelf.

As can be seen in FIG. 16, the resultant Rr, which is transferred from the known device 100' to the shelf 200, acts specifically in correspondence with the section of the shelf having a smaller thickness, due to the presence of the housing seat for the device formed in said section With particular reference to FIGS. 4 to 19, the shelf-supporting device 1, 1', 1" for the reversible connection of a shelf 200 to the shoulders 300 of a piece of furniture according to the present invention is configured for being inserted into a seat 201 formed within the thickness of the shelf 200 and, for this purpose, comprises a main body 12, 12', 12" which is slidingly associated with a connection pin 11 movable between a first operating position wherein said pin 11 protrudes from said shelf 200 so as to be able to be inserted into a housing seat 301 formed on one of said shoulders 300, and a second retracted position wherein the pin 11 does not protrude from said shelf 200 or protrudes so as to be able to be in any case released from the housing seat 301 formed in the shoulder.

The shelf-supporting device according to the present invention advantageously comprises a main body 12, 12', 12" having a solid section in correspondence with its front area 14.

With the expression "solid section", it should be understood, in this description and in the following claims, that the front area has a continuous wall interrupted only by the hole through which the pin 11 passes; the front area 14, in fact, clearly visible for example in FIG. 4, is the portion of the device close to the front surface 14a from which the pin 11 protrudes, and which faces the shoulder of the furniture when the device is assembled.

In a front transverse section, the area of the hole through which the pin 11 passes is about 10 times smaller than the continuous surface of the front area; this guarantees a high robustness.

As the main body 12, 12' internally comprises the means 30 for moving the pin 11, and it is therefore internally shaped so as to provide a seat 21 for housing said movement means 30, the shelf bracket according to the present invention provides that the main body 12, 12' has a front portion 14 not affected by the reduction in thickness of material consequent to the formation of this seat 21. This front area 14 therefore has a section on a transverse plane with a full thickness, within which the seat 14' which will be illustrated further on, is formed.

Furthermore, the main body 12, 12', 12" advantageously has a shaped profile so that at least a portion of the upper surface 12c, 12c', 12c" of the main body 12, 12', 12" does not come into contact the upper internal wall 201' of the housing seat 201 of said main body 12, 12', 12" formed within said shelf 200 when the device is assembled to the shelf.

As can be seen for example from FIGS. 17, 18 and 19, the housing seat 201 formed in the shelf 200 is advantageously obtained by milling and has, on a transverse plane, a substantially oval profile.

The transverse oval profile of the housing seat 201 can, as is known, be easily obtained by means of a milling operation and is therefore among the preferable forms together with the simple circular section of a cylindrical hole.

As can be seen in FIGS. 17, 18 and 19, the shelf bracket 1, 1', 1" according to the present invention has, seen on a transverse plane, a bevel in correspondence with said at least a portion of its upper surface 12c, 12c', 12c" so that the latter does not come into contact with the upper internal surface 201' of the housing seat 201.

The flat profile of the upper portion of the device is also clearly visible in the perspective view of FIG. 5.

Furthermore, the main body 12 of the shelf-supporting device 1 according to the present invention advantageously comprises, on its outer surface, one or more projecting elements 13 which extend outwardly.

As can be seen in particular from the perspective view of FIG. 5, from the view from above of FIG. 13, and from the raised side views of FIGS. 11 and 12, the shelf-supporting device 1 according to the present invention has a substantially box-like shape comprising an upper surface 12c, a lower surface 12d, a front area 14 from whose front surface 14a the pin 11 protrudes, and a pair of side surfaces 12e, and comprises said one or more projecting elements 13 which protrude outwardly from the side surfaces 12e of said box-like body 12.

Said one or more projecting elements 13 advantageously protrude towards the outside of said side surfaces 12e at least in correspondence with said front area 14 of the box-like body 12.

Said one or more projecting elements 13 preferably have a substantially triangular profile on a transverse plane so as to have a shape that facilitates the insertion of the shelf bracket 1 into the seat 201 formed in the shelf 200 by means of interference. The insertion of the device into the seat can be advantageously forced so that the projecting elements themselves create their own seat in the shelf, generally made of wood, as occurs with the insertion of a self-tapping screw.

For this purpose, said one or more projecting elements 13 can have a greater extension in a transverse direction in correspondence with the front area 14 of the box-like body 12, and are tapered, reducing their overall dimensions, in a transverse direction towards the rear area of the device, opposite the front area 14. In this way the insertion of the shelf bracket into the seat 101 and the creation of the seats for said projecting elements 13 are facilitated.

The shelf bracket 1 can therefore be firmly coupled with interference into the seat 201.

In order to allow an optimal release of the forces, the dimensions of the projecting elements are preferably such as to have a certain extension with respect to the device; it is evident in fact that excessively small projecting elements would not allow an optimal discharge of the forces.

In this sense, in a front transverse section and considering a measurement along a measurement line starting from the centre of the pin and arriving at the end of the projecting element, the ratio between the dimension of the projecting element and the dimension of the body (both measured along said measurement line) preferably ranges from about 1 to 5 and from 1 to 10; more preferably, if the transverse section of the device is round, the above-mentioned ratio is approximately equal to 1 to 5, whereas if the transverse section is substantially oval, the above-mentioned ratio is approximately equal to 1 to 10.

The box-like body 12 of the shelf-supporting device 1 according to a first preferred embodiment of the present invention advantageously has a substantially symmetrical profile with respect to a horizontal symmetry plane and said one or more projecting elements 13 protrude outwardly from the side surfaces 12e of the box-like body 12 substantially in correspondence with said horizontal symmetry plane.

In this way, the forces that the pin 11 transfers to the shelf bracket 1 are discharged onto the shelf through these projecting elements 13, as shown in FIG. 17 by the arrows Rr (shelf resultant), i.e. in an area of the shelf where the latter has a solid section, with a maximum thickness, and no longer in correspondence with the upper area of the seat 101 in which there is a reduced thickness of material, as occurs with known devices according to what is schematized in FIG. 16.

In accordance with a second preferred embodiment of the present invention, visible for example in FIG. 18, the shelf-supporting device 1' can have said one or more projecting elements 13 which extend outwardly from the side surfaces 12e of the main body 12' beneath an ideal horizontal symmetry plane.

Again, in accordance with a third preferred embodiment of the present invention, visible for example in FIG. 19, the shelf-supporting device 1" can have a substantially cylindrical main body 12", advantageously having said one or more projecting elements 13 which protrude outwardly laterally from said main body 12".

Even more preferably, in order to better distribute the forces that are transferred from the shelf bracket to the shelf, said one or more projecting elements 13 extend along the whole length of the side surfaces 12e, 12e', 12e" of the main body 12, 12', 12", preferably tapering, as already mentioned, from the front area towards the rear area of the device.

The shelf-supporting device 1', 1" according to the present invention advantageously has a main body 12', 12" having, on a transverse sectional plane, a substantially "flattened" oval profile, i.e. wherein the transverse sides have a straight section.

This configuration is, as mentioned, one of the preferred configurations as it allows insertion into a seat 201 formed in the shelf 200 by means of a simple milling operation.

The box-like body 12, 12', 12" preferably comprises an upper surface 12c, 12c', 12c" which has a bevel, clearly visible for example in FIG. 5, so that, in use, when the device is inserted in the seat 201 having a substantially oval section obtained by milling, said upper surface 12c, 12c', 12c" of the main body 12, 12', 12" does not come into contact with the upper internal wall 201' of said housing seat 201.

The result obtained when the device is inserted in the seat formed in the shelf can be seen in FIG. 17, where the distance d created between the upper surface 12c, 12c', 12c" of the main body 12, 12', 12" of the device 1, 1', 1", and the upper internal surface 201' of the housing seat 201 formed in the shelf 200, can be seen.

According to what is illustrated by way of non-limiting example in the attached figures, the main body 12 of the shelf-supporting device 1 according to the present invention comprises a base body 12b which internally defines a seat 21 for housing actuation means 15, 16, 17 of the pin 11, and a cover 12a suitable for closing said base body 12b from above.

According to a preferred embodiment of the shelf-supporting device 1 according to the present invention illustrated in the attached figures, the box-like body 12 comprises, in correspondence with the front area 14 having a solid section, an open seat 14' in correspondence with the lower surface 12d of the box-like body 12 and suitable for receiving a T-shaped nut 18.

The nut 18 comprises a main body 18a provided with a pass-through hole 18d for the passage of the pin 11, and a base portion 18b defining two flaps 18c projecting laterally with respect to said main body 18a.

When the device is assembled, the main body 18a of the nut 18 is inserted into said seat 14', whereas the flaps 18c of said base portion 18 become abutted against said box-like body 12.

The situation can be very clearly seen in FIG. 17, where the resultants of the forces discharged through the nut 18 when the resultant force Rp is applied to the pin 11, are represented by the arrows Rd.

As can be seen, thanks to the presence of the T-nut 18 and crossed by the pin 11, the forces Rp which, when the device is in use, act on the pin 11, are transferred to the box-like body 12 in correspondence with its front area 14 having a solid section.

The actuation means 15, 16, 17 of said pin 11 advantageously comprise axial movement means 15 of the pin 11 which are movable along the longitudinal movement direction X of the pin 11, and motion transformation means 16 suitable for transforming the movement rotation of an actuation tool in the translational movement of said axial movement means 15.

Said axial movement means 15 of the pin 11 advantageously comprise a slide 15 connected or produced integrally with said pin 11. In turn, the slide 15 comprises a longitudinal groove and a shaped internal seat, and the motion transformation means comprise a rotating element 16 having a substantially cylindrical main body 16a and a cam-shaped element 16b connected to said main body 16a.

The cylindrical main body 16a of the rotating element 16 is rotatably inserted into said longitudinal groove 15a of said slide 15 and said cam-shaped element 16b interacts with the internal shaped seat of said slide 15 so that a rotation of the main body 16a of the rotating element 16, imposed by the operator through a tool of the type shown in FIGS. 2 and 3, causes movement of the slide 15 in an axial direction X.

Said axial movement means 15 of the pin 11 preferably further comprise, associated with said slide 15, elastic means, for example comprising a helical spring 17, suitable for keeping said slide 15 in an advanced position and consequently said pin 11 in its operating position. In order to retract the slide, and consequently the pin, the action of the spring 17 must be overcome, whereas with a simple rotation of the rotating element 16 by means of a tool, the cam 16b can be released from the blocked condition of the device in the non-operating position, allowing the advancement of the slide 15 by the spring 17.

In the shelf-supporting device 1 according to the present invention, the slide 15 and the pin 11 are advantageously connected to each other by means of a shape coupling.

The present invention has been described, for illustrative but non-limiting purposes, with reference to various preferred embodiments, it should be understood however that variations and/or modifications can be applied by a skilled person in the field without thereby departing from the relative protection scope, as defined in the enclosed claims.

The invention claimed is:

1. A shelf-supporting device (1, 1', 1") for a reversible connection of a shelf (200) to a shoulder (300) of a piece of furniture, said shelf-supporting device being configured to be inserted inside a shelf seat (101) formed within a thickness of said shelf (200), the device comprising:
   a main body (12, 12', 12"), which is slidingly associated with a connection pin (11) movable between a first operating position, in which said connection pin (11) protrudes from said shelf (200) so as to be able to be inserted into a housing seat (301) formed on said shoulder (300), and a second retracted position, in which said connection pin (11) does not protrude from said shelf (200) or protrudes so as to be able to be released from said housing seat (301),
   wherein said main body (12, 12', 12") has a solid section at its front area (14), from whose surface (14a) said connection pin protrudes (11), and
   wherein said body (12, 12') comprises, at said front area (14), a body seat (14') open on a lower surface (12d, 12d') of the main body (12, 12') and configured to receive a T-nut (18), said T-nut comprising a main nut body (18a) provided with a pass-through hole (18d) for passage of the connection pin (11) and a base portion (18b) defining two flaps (18c) protruding laterally with respect to said main nut body (18a).

2. The shelf-supporting device (1, 1') according to claim 1, wherein, when the shelf-supporting device is assembled, said main nut body (18a) of said T-nut (18) is inserted into said body seat (14'), whereas said two flaps (18c) of said base portion (18b) are abutted against said main body (12, 12"), so that forces which, when the shelf-supporting device is in use, act on the connection pin (11), are transferred, through said T-nut (18), to the main body (12, 12") of the shelf-supporting device in correspondence with the front area (14) having the solid section.

3. The shelf-supporting device (1, 1') according to claim 2, wherein said main body (12, 12') is box-shaped and comprises an upper surface (12c'), a lower surface (12d, 12d'), a front area (14), from which said connection pin (11) protrudes, and a pair of side surfaces (12e, 12e').

4. The shelf-supporting device (1") according to claim 1, wherein said main body (12") is cylindrical in shape and comprises a beveled upper surface (12c"), a lower surface (12d"), and a side surface (12e").

5. The shelf-supporting device (1, 1', 1") according to claim 1, wherein said main body (12, 12', 12") comprises, on its outer surface, one or more projecting elements (13) that extend outwardly of said main body (12, 12', 12").

6. The shelf-supporting device (1, 1',1") according to claim 5, wherein said one or more projecting elements (13) protrude outwardly from one or more side surfaces (12e, 12e') of said main body.

7. The shelf-supporting device (1, 1', 1") according to claim 6, wherein said one or more projecting elements (13) extend outwardly of said one or more side surfaces (12e, 12e', 12e") at least in correspondence with said front area (14) of said main body (12, 12', 12").

8. The shelf-supporting device (1) according to claim 7, wherein said one or more projecting elements (13) have a triangular profile on a transverse plane.

9. The shelf-supporting device (1, 1") according to claim 5, wherein said main body (12, 12") has a symmetrical profile with respect to a horizontal symmetry plane, said one or more projecting elements (13) extending outwardly from side surfaces (12e, 12e') of said main body (12) in correspondence with said horizontal symmetry plane.

10. The shelf-supporting device (1, 1', 1") according to claim 5, wherein said main body (12, 12', 12") comprises said one or more projecting elements (13) extending outwardly from side surfaces (12e, 12e', 12e") of said main body (12, 12', 12") and below a horizontal symmetry plane.

11. The shelf-supporting device (1, 1', 1") according to claim 5, wherein said one or more projecting elements (13) extend along an entire length of side surfaces (12e, 12e', 12e") of said main body (12, 12', 12").

12. The shelf-supporting device (1, 1', 1") according to claim 5, wherein said one or more projecting elements (13) have a greater transversal extension in correspondence with the front area (14) of the main body (12, 12', 12"), and are tapered, reducing overall dimensions of said one or more projecting elements (13), in a transverse direction towards a rear area of the shelf-supporting device (1, 1', 1"), opposite the front area (14).

13. The shelf-supporting device (1, 1') according to claim 3, wherein said box-shaped main body (12, 12') has, on a transverse sectional plane, a flattened oval profile, in which transversal sides have a straight portion.

14. The shelf-supporting device (1, 1', 1") according to said claim 1, wherein an upper surface (12*c*, 12*c'*, 12*c"*) of said main body (12, 12', 12") has a bevel so that, when the shelf-supporting device is inserted in the shelf seat (201), said shelf seat having an oval section formed in said shelf, said upper surface (12*c*, 12*c'*, 12*c"*) of the main body (12, 12', 12") does not come into contact with an upper internal wall (201') of said shelf seat (201).

15. The shelf-supporting device (1) according to claim 3, wherein said box-shaped body (12) comprises a base body (12*b*) internally defining a seat for housing actuation means (15, 16, 17) of said connection pin (11) and a lid (12*a*) configured to close said box-shaped body (12) from above.

16. The shelf-supporting device (1, 1', 1") according to claim 1, wherein said main body (12, 12', 12") has a shaped profile so that an upper surface (12*c*, 12*c'*, 12*c"*) of the main body (12, 12', 12") does not come into contact with an upper internal wall (101') of the shelf seat (201) of said main body (12, 12', 12") formed within said shelf (200) when the shelf-supporting device is assembled in the shelf.

17. The shelf-supporting device (1, 1', 1") according to claim 15, wherein said actuation means (15, 16, 17) of said connection pin (11) comprise axial movement means (15) of the connection pin (11) movable along an axial movement direction (X) of the connection pin (11), and motion transformation means (16) configured to transform a rotary movement of an actuation tool into a translational movement of said axial movement means (15).

18. The shelf-supporting device (1, 1', 1") according to claim 17, wherein said axial movement means (15) of the connection pin (11) comprise a slide (15) connected to or formed integrally with said connection pin (11), said slide (15) comprising a longitudinal groove (15*a*) and a shaped internal seat, and wherein said motion transformation means (16) comprise first element (16) having a cylindrical main body (16*a*) and a second element that is cam-shaped (16*b*) connected to said main body (16*a*), said cylindrical main body (16*a*) of said first element (16) being rotatably inserted into said longitudinal groove (15*a*) of said slide (15) and said cam-shaped element (16*b*) interacting with an internal shaped seat of said slide (15) so that a rotation of the cylindrical main body (16*a*) of said first element (16) with a tool causes movement in an axial direction of the slide (15).

19. The shelf-supporting device (1, 1', 1") according to claim 18, wherein said axial movement means (15) of the connection pin (11) further comprise, associated with said slide (15), elastic means (17) configured to keep said slide in an advanced position and, said connection pin (11) in an operating position thereof.

20. The shelf-supporting device (1, 1', 1") according to claim 18, wherein said slide (15) and said connection pin (11) are connected to each other by shape coupling.

\* \* \* \* \*